United States Patent [19]

Thomas et al.

[11] Patent Number: 4,540,543

[45] Date of Patent: Sep. 10, 1985

[54] INJECTION BLOW MOLDING PROCESS AND APPARATUS

[75] Inventors: Tommy Thomas, Toronto; John W. West, Oakville, both of Canada

[73] Assignee: Canada Cup, Inc., Toronto, Canada

[21] Appl. No.: 618,956

[22] Filed: Jun. 11, 1984

[51] Int. Cl.³ ............................................. B29C 17/07
[52] U.S. Cl. ................................... 264/526; 264/538; 425/525; 425/533; 425/534; 425/535; 425/537
[58] Field of Search ..................... 264/526, 537, 538; 425/525, 533, 534, 535, 537

[56] References Cited

U.S. PATENT DOCUMENTS

| | | | |
|---|---|---|---|
| 3,583,031 | 6/1971 | Kader et al. | 425/534 X |
| 3,776,991 | 12/1973 | Marcus | 264/538 X |
| 3,785,116 | 1/1974 | Munz et al. | 425/533 X |
| 3,819,314 | 6/1974 | Marcus | 425/533 X |
| 3,978,184 | 8/1976 | Dybala et al. | 425/534 X |
| 4,459,095 | 7/1984 | Rohr et al. | 425/534 X |

FOREIGN PATENT DOCUMENTS 1802915  6/1970  Fed. Rep. of Germany ...... 425/534

*Primary Examiner*—Jan Silbaugh
*Attorney, Agent, or Firm*—Bachman and LaPointe

[57] ABSTRACT

A method and apparatus for injection blow molding hollow plastic articles characterized by a rapid and efficient operating cycle. The injection mold includes a mold cavity and the blow mold is located adjacent the mold cavity in side-by-side relationship. The parison is injection molded into the mold cavity onto a core. The parison on the core is separated from the mold cavity by moving the parison on the core axially in a straight path away from the mold cavity, followed by movement in a substantially arcuate path into axial alignment with the blow mold, followed by axial movement in a straight path into said blow mold.

21 Claims, 8 Drawing Figures

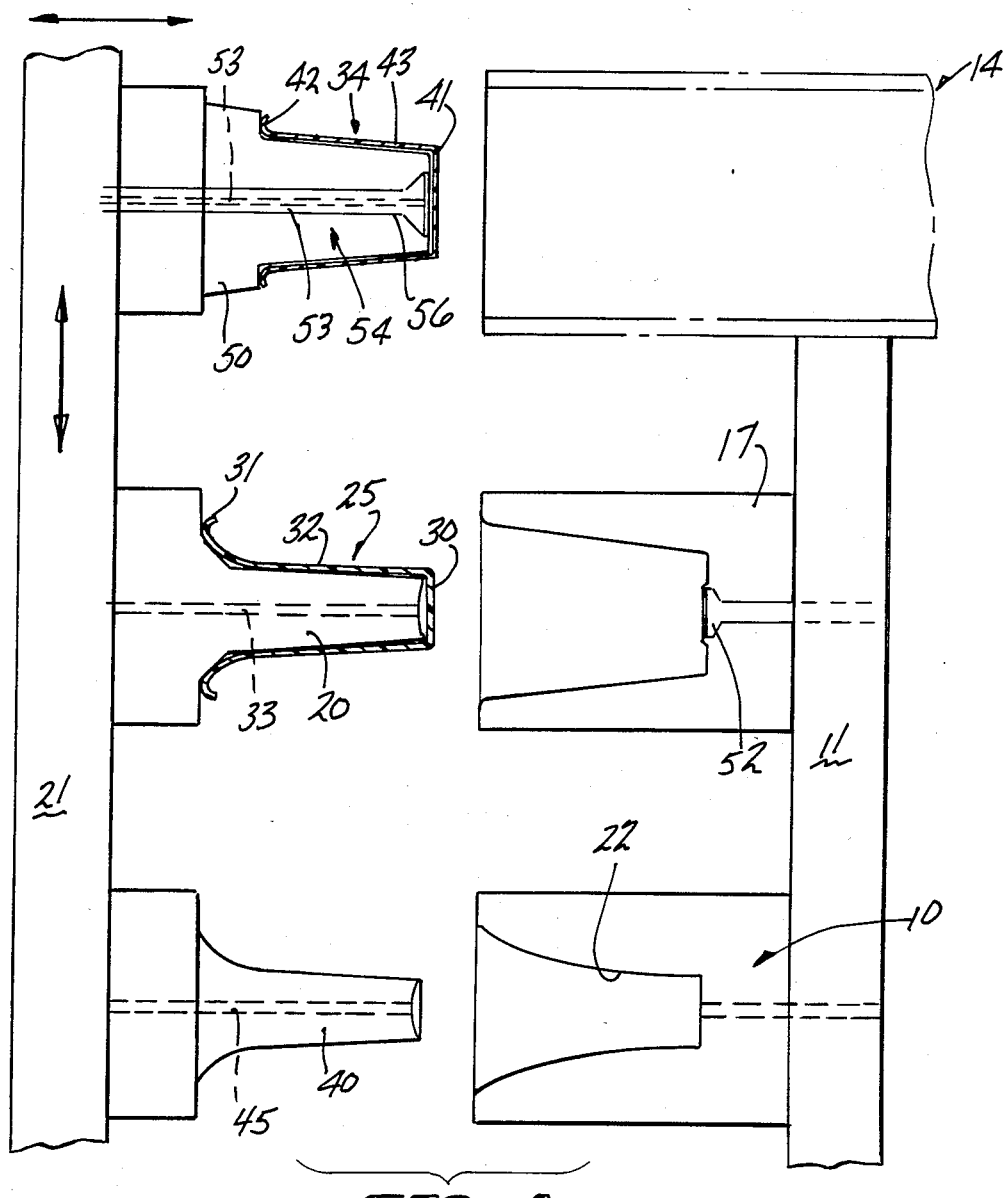
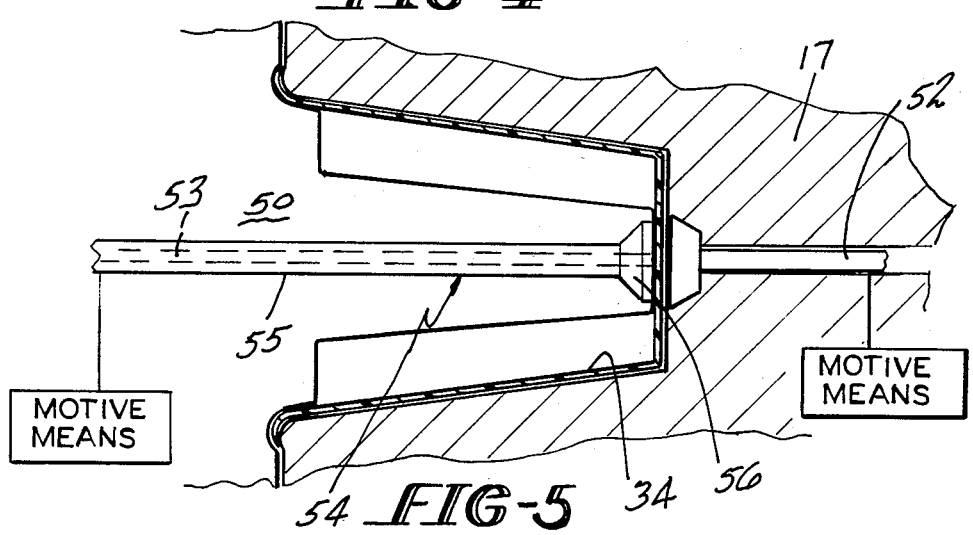

INJECTION BLOW MOLDING PROCESS AND APPARATUS

BACKGROUND OF THE INVENTION

Injection blow molding processes and apparatus are widely known and widely used in industry. For example, reference should be had to U.S. Pat. No. 3,183,552 to Farkas, U.S. Pat. No. 3,819,314 to Marcus, U.S. Pat. No. 3,339,231 to Piotrowski and Canadian Pat. No. 995,418 to Cannon et al.

It is and has been a long standing objective of art processes to achieve a high productivity, i.e., to develop a process with a rapid, efficient and economical operating cycle. Art processes known heretofore are subject to one or more significant disadvantages. Frequently, they are cumbersome and expensive to operate. Frequently, they are characterized by a relatively slow operating cycle. A shorter operating cycle is particularly desirable since it is directly translatable into a larger number of end products produced.

Processes are known with overlapping cycles in order to reduce overall cycle time, for example, by providing that while one parison is being molded another is being blown and still another is being removed. However, even with processes using overlapping cycles the overall cycle time still leaves much to be desired and still necessitates improvement in cycle time.

The foregoing difficulties are further compounded by frequent lack of reliability of prior art processes necessitating frequent interruptions of the operation and thereby further impairing operating efficiency.

Accordingly, it is a principal object of the present invention to provide a process and apparatus for injection blow molding hollow plastic articles characterized by a rapid, efficient and economical operating cycle.

It is a still further object of the present invention to provide a process and apparatus as aforesaid which is convenient and easy to use on a commercial scale and may be reliably used with high productivity.

Further objects and advantages of the present invention will appear from the following specification.

SUMMARY OF THE INVENTION

In accordance with the present invention, it has now been found that the foregoing objects and advantages are obtained. The method and apparatus of the present invention are for injection blow molding hollow plastic articles. The method comprises: providing an injection mold including a mold cavity formed by a mold wall and a core; injecting molten plastic into said cavity to form a parison on said core; separating said parison from said mold wall by moving said parison on said core axially in a straight path away from said mold wall; providing a blow mold adjacent said mold cavity in side-by-side relationship therewith; moving said parison on said core in a substantially arcuate path into axial alignment with said blow mold; moving said parison on said core axially in a straight path into said blow mold; and expanding said parison on said core in said blow mold to form said hollow article.

The apparatus of the present invention comprises: an injection mold including a mold wall; a core engageable with said injection mold to form a mold cavity with said mold wall; means to inject molten plastic into said mold cavity to form a parison therein; a blow mold adjacent said mold cavity in side-by-side relationship therewith; means to separate said parison from said mold wall operative to move said parison on said core axially in a straight path away from said mold wall, followed by in a substantially arcuate path into axial alignment with said blow mold, followed by axially in a straight path into said blow mold; and means to expand said parison on said core in said blow mold to form said hollow article.

The core is preferably separated from the hollow article leaving the article in the blow mold and returned to the injection mold for another cycle along paths corresponding to the foregoing paths, i.e., axially, substantially arcuate and axially into the injection mold. An ejection station may then be provided adjacent the blow mold in side-by-side relationship. An ejection core can transfer the hollow article from blow mold to ejection station and return along paths corresponding to the paths of the core.

In the preferred embodiment a second core, second ejection station, second blow mold and second ejection core are provided on the side opposed to the blow mold and ejection station for operation of an overlapping cycle. The second core and second ejection core move on paths corresponding to the paths of the core and ejection core. That is, when the core is in the blow mold the second core is in the injection mold.

A major advantage of the present invention resides in the rapid operating cycle enabled by the critical movement paths. Also, the process and apparatus are simple, convenient to operate and reliable. The resultant high productivity is a significant feature.

Further advantages and features of the present invention will appear hereinbelow.

BRIEF DESCRIPTION OF THE DRAWINGS

The present invention will be more readily understandable from a consideration of the drawings in which:

FIG. 4 is a partial, expanded elevational view showing additional details;

FIG. 5 is a detailed view of the ejection core engaged with the hollow article in the blow mold;

DETAILED DESCRIPTION

Figure 1:
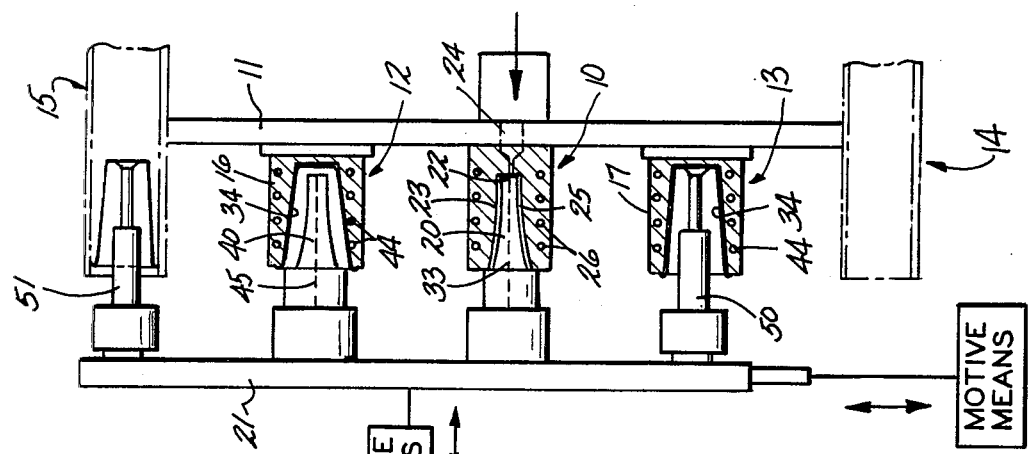
FIG. 1 is an elevational view showing the apparatus of the present invention in the closed position with the core in the injection mold.
Figure 2:
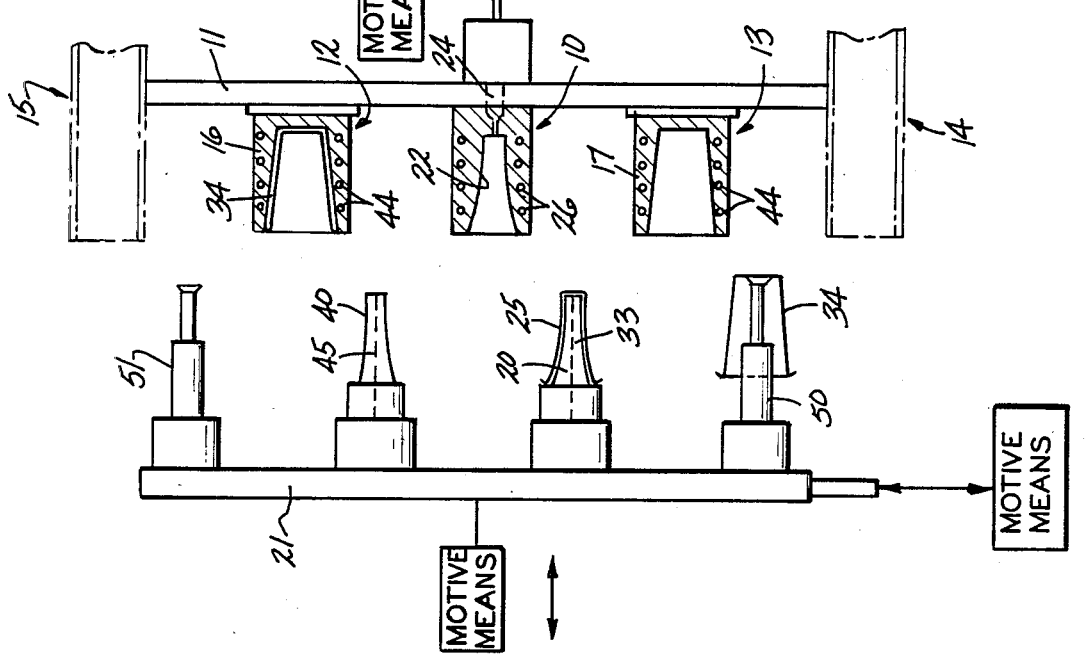
FIG. 2 is a view similar to FIG. 1 with the apparatus in the open position with the core and parison in the midst of transfer to the blow mold.
Figure 3:
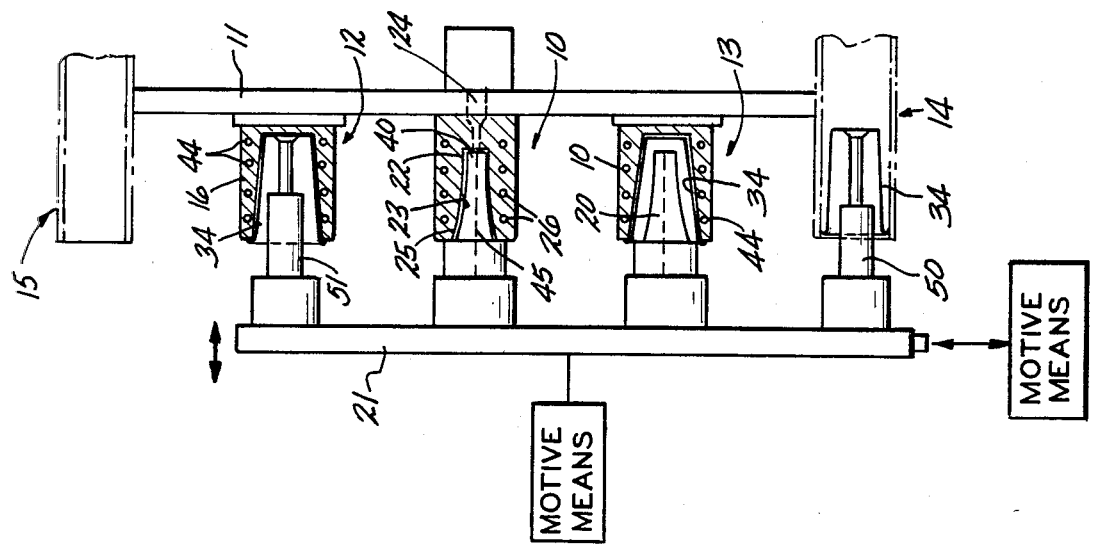
FIG. 3 is a view similar to FIG. 1 with the apparatus in the closed position with the core and parison in the blow mold and with the second core in the injection mold.

Referring to FIGS. 1-3, injection station 10 is secured in fixed platen 11. Blow stations 12 and 13 are also secured to fixed platen 11 and are situated adjacent injection station 10 and in side-by-side relationship with respect thereto, with blow station 12 containing blow mold 16 which may be split if desired being on one side of the injection station and blow station 13 containing blow mold 17 which may be split if desired being on the other side. Blow molds 16 and 17 are in the shape of the hollow articles to be made. Ejection stations 14 and 15 are also secured to fixed platen 11 and are situated adjacent the respective blow stations in side-by-side relationship with respect thereto, with ejection station 14 situated adjacent blow station 13 and ejection station 15 situated adjacent blow station 12.

Core 20 is provided secured to movable platen 21 engageable with injection station 10 as shown in FIG. 1. The injection station 10 includes mold wall 22. Thus, when core 20 is engaged with injection station 10 as shown in FIG. 1 the core 20 is spaced from the mold wall 22 to form mold cavity 23 therebetween. Injection means 24 is in communication with mold cavity 23 and is connected to a source of hot flowable plastic (not shown) for forcing said hot formable plastic under pressure into mold cavity 23 to form parison 25.

Core 20 is movable into and out of engagement with injection station 10 by movable platen 21 actuated by the motive means shown schematically in FIG. 1 and to be described in more detail hereinbelow. Naturally, the movement of platen 21 may be accomplished by conventional means, shown only schematically in FIG. 1, which are capable of providing a clamping force between the two platens to keep them from separating during the injection step and the other steps which will be described below. It should be understood that while movement of platen 21 is described, one may of course move platen 11 or both platens 11 and 21, if desired.

The hot, newly formed parison 25 remains in mold cavity 23 until sufficiently cooled to be removed, if desired using cooling means 26 adjacent mold wall 22, as for example, by fluid circulation. If desired, such cooling means may also be provided in core 20. After such cooling of parison 25 the clamping force is released and platen 21 is moved away from platen 11 carrying with it core 20 and parison 25 adhered thereto. If a neck mold is used as to form a threaded neck portion the neck mold is openable by conventional means and remains closed during the formation of the parison, removal of the parison from the injection station and blowing, which also aids in retention of the parison on the core. In the present embodiment a neck mold is not employed and both the parison and final article have a cup-shaped configuration as seen in the drawings and clearly shown in FIG. 4. Thus, parison 25 has a base portion 30, a curved lip 31 and outwardly flaring side walls 32 extending from base 30 to lip 31. Curved lip 31 may serve as an undercut to aid in retention of the parison on the core. Core 20 is provided with fluid passageway 33 connected to a source of fluid pressure for blowing the final article. If desired, a vacuum may be drawn through passageway 33 to aid in retention of the parison on the core.

Core 20 with parison 25 thereon is then moved to blow station 13 as shown in FIGS. 2 and 3 in a manner which first separates the parison from the mold wall 22 by moving the parison on core 22 axially in a straight path away from said mold wall at least until the parison clears the injection station, followed by movement in a substantially arcuate path into axial alignment with blow station 13 and blow mold 17, followed by moving the parison on the core axially in a straight path into blow mold 17. Parison 25 is then expanded on core 20 in blow mold 17 by fluid pressure through passageway 33 to form hollow article 34. FIG. 1 shows core 20 engaged with the injection station. FIG. 2 shows core 20 with parison 25 thereon removed from the injection station on its arcuate path between injection station 10 and blow station 13 with platen 21 and core 20 at the peak of their arcuate path. FIG. 3 shows core 20 engaged with blow station 13 forming hollow article 34 therein.

After the formation of hollow article 34, core 20 is removed from blow station 13 leaving hollow article 34 remaining therein and returned to the injection station along paths corresponding to the path taken by core 20 from the injection station 10 to the blow mold 17, that is, the core is moved axially in a straight path away from blow mold 17 followed by movement in a substantially arcuate path into axial alignment with said injection station, followed by movement axially in a straight path into said injection station for repeat of the cycle.

Second core 40 having fluid passageway 45 similar to passageway 33 is provided on movable platen 21 adjacent core 20 in side-by-side relationship with respect thereto. Second core 40 is engageable with injection station 10 when core 20 engages blow mold 17 to form a second parison in an overlapping cycle with respect to core 20. Thus, second core 40 engages injection station 10 to form a parison 25 in a manner similar to the formation of a parison on core 20 in the injection station 10. The formation of a parison on core 40 takes place while core 20 is in the blow mold 17 forming the hollow article. Core 40 carrying a parison 25 is then removed from the injection station and transferred to blow station 12 and blow mold 16 in a path corresponding to the transfer path of core 10 to blow station 13 and blow mold 17 for formation of an additional hollow article 34 in blow mold 17. The transfer of core 40 to blow mold 17 takes place simultaneously with the return of core 20 to injection station 10.

After removal of core 20 from blow station 13 hollow article 34 remains in blow mold 17. Hollow article 34 corresponds in shape generally to parison 25 with an expanded configuration caused by the blowing step. Thus, article 34 has a base portion 41, curved lips 42 and outwardly flaring side walls 43 extending from base 41 to lips 42. The blown article 34 cools in contact with the walls of the blow mold which may contain cooling means 44, as for example for cooling by fluid circulation in a conventional manner. Article 34 may be retained in the blow mold by any desired means as by applying a vacuum to the inside of the blow mold or providing means on the blow mold to engage lip 42. Ejection core 50 and second ejection core 51 are provided on movable platen 21 adjacent and in side-by-side relationship to cores 40 and 20, with ejection core 50 alongside core 20 and second ejection core 51 alongside second core 40. Thus, when cores 20 and 40 leave their respective blow molds 17 and 16 with the hollow articles remaining therein for return to the injection station, ejection cores 50 and 51 move into engagement with said hollow articles in the blow molds along paths corresponding to the paths of cores 20 and 40. Cores 50 and 51 then disengage from the blow molds removing hollow articles 34 with them and move from the blow stations to the ejection stations along paths corresponding to the paths of cores 20 and 40. Removal of hollow article 34 onto the ejection cores may be assisted by pusher means 52 operatively associated with blow molds 16 and 17 for positively pushing article 34 away from the blow molds, see FIGS. 4 and 5. Also, ejection cores 50 and 51 may be provided with fluid passageways 53 connected to a source of fluid pressure (not shown), see FIG. 5, which may be used to draw a vacuum and aid in removal of hollow article 34 from the respective blow molds. The final hollow article is then transferred to the respective ejection station, which may incorporate any suitable ejection means as a chute, suction tube or other conventional means to convey plastic articles. Removal of article 34 from the ejection cores 50 and 51 at ejection stations 14 and 15 may be assisted by fluid pressure from passageway 53 and also by stripper 54 including stem 55 to which a widened cap 56 is attached (FIGS. 4 and 5) movable axially via motive means (not shown). After removal of the hollow article 34 at the ejection stations the cycle is repeated.

The present improvement, particularly for use with cup-shaped articles, assures holding of the articles concentrically on the mandrels and effecting reliable transfer as shown in FIG. 5. In operation, the parison is transferred into blow mold 17 as above described and blown into final shape therein, followed by insertion of mandrel 50 which is shorter than the depth of the blow mold. In order to remove the blown article 34, pusher plate 52 is advanced forcing the blown article onto mandrel 50 which is then withdrawn. If desired, vacuum may be applied through passage 53 better to assure adherence of article 34 to the mandrel during withdrawal from the blow mold. Clearly, pusher plate 52 and the stripper cap 56 may also be used to shape the portion of article 34 between them. If a rim undercut is embedded in the blow mold, it is overcome to effect release from the blow mold by the action of pusher plate 52 which has a stroke at least sufficient for the length of said undercut, it being understood that a given article may exhibit more than one undercut. In this manner, sticking of the finished article to the blow mold is avoided. Subsequently, mandrel 50 carrying article 34 is aligned with removal devices as described above and, since all relative movement between the mandrel and the blow mold may be precluded due to the close fit of the mandrel and the article at the neck of the article, which may be an interference fit or an undercut, and, if necessary due to the vacuum, the alignment will be consistent from cycle to cycle. Upon alignment with the ejection station, the vacuum if theretofore applied through channel 53 is released and stripper 54 is actuated to urge the article into engagement with the ejecting device by positive mechanical means.

The advantage of this arrangement compared to previous practice is in its reliability, preventing interruptions of the operation and thereby improving efficiency.

While the foregoing description shows a single injection mold and core set, it will naturally be understood that multiple injection mold and core sets may readily be employed, for example, arranged side-by-side or in several rows.

Thus, it can be seen that the process and apparatus of the present invention obtains significant advantages. The overlapping cycles enable plural operations to be conducted simultaneously. While core 20 is engaging injection station 10 to form a first parison, second core 40 is engaging blow mold 16 to form a final article 34, second ejection core 51 is ejecting a hollow article at ejection station 15 and ejection core 50 is engaging a hollow article at blow station 13 for removal thereof, with the axial, arcuate and axial movement described hereinabove providing a considerable advantage in reduction in cycle time which of course is a prime consideration in this art.

Injection molding was heretofore favored for cup-shaped articles because of its short operating cycles in spite of the fact that the product weighed more than if it had been injection blow molded. Thus, an injection molded cup weighing 8 grams in polystyrene would turn out to be less costly than one weighing only 5 grams as injection blow molded, the material cost advantage of the latter being offset by the lower molding cost of the former.

The so-called "dry cycle" is that part of the total operating cycle of the apparatus described in FIGS. 1-3 which is not attributable to process related factors but only to the mechanism. The total cycle divides into the dry cycle and the process cycle. In an injection blow molding operation the pressure molding of the parison typically takes longer than the finishing thereof by blowing or the removal of the blown article. These three steps overlap so that while one parison is being molded another is being blown and still another is being removed after having been blown. Accordingly, the longest of these three steps determines the overally process cycle. Considering the injection molding step by itself it is found that the process of pressure molding and cooling the parison sufficiently to be removable from the injection mold takes about one (1) second for a polystyrene cup referred to above, while the dry cycle of the injection mold clamping apparatus is apt to take nearly four (4) seconds in a conventional device. The dry cycle as such, being the greatest part of the total cycle, could not heretofore be reduced because of the time consuming movement of the core assembly away from the injection mold, sideways into alignment with the blow mold and towards the blow mold, including the reverse of same. This is true of prior linear and rotary systems.

Figure 8:
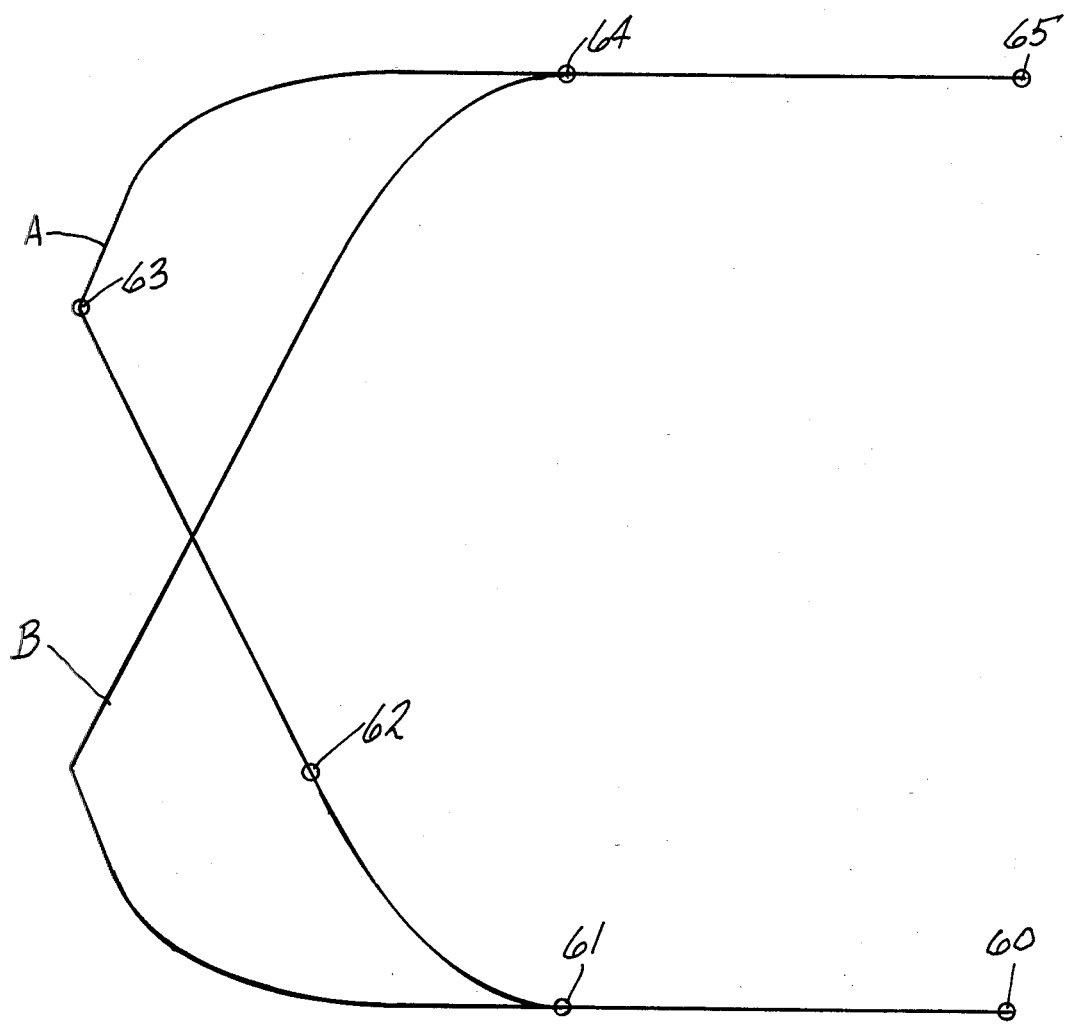
FIG. 8 is a line chart showing core movement from injection mold to blow mold and return.

In accordance with the present invention, however, the axial, arcuate and axial movement substantially reduces the dry cycle time and thus reduces the overall cycle time. Referring to FIG. 8, the movements of movable platen 21 are shown diagrammatically, which will of necessity include the movement of the cores thereon. Thus, when platen 21 moves from the position in FIG. 1 to the position in FIG. 3 a given point on the platen will follow curve A. The return movement will follow curve B. As platen 21 moves away from platen 11 the section on curve A from location 60 to 61 represents movement from the closed position of FIG. 1 to that point at which movement of core 20 with parison 25 thereon may occur laterally without mechanical interference. As soon as location 61 is passed said point starts its lateral movement which is subdivided into three (3) sections, namely between locations 61 and 62 in which acceleration is taking place, then between 62 and 63 in which the velocity of the point is constant, followed by between 63 and 64 in which deceleration is taking place. Finally, locations 64 and 65 show the approach to the blow mold and the position shown in FIG. 3. Naturally, the actual shapes of the curve segments will depend on the mass being moved, with the segment being steeper the lighter the movement assembly. As indicated above, curve B depicts the reverse movement. These movements can be effected by any conventional means, e.g. fluid actuators or by cam action. If by fluid actuators, it is readily possible to initiate their movement and thus also that of platen 21 by a limit switch placed to be tripped by platen 21 as soon as said platen reaches the distance from platen 11 at which the lateral movement of core 20 can take place unimpeded. If by cam action, fixed cams in the shape of curves A and B of FIG. 4 may be used and platen 11 may be equipped with corresponding cam followers, to the effect that the axial movement of platen 21 will at the same time induce its lateral movement according to the cam path. Other means to produce the same result may be employed so long as the lateral movement of platen 21 is effectively controlled by its axial movement, whereby said lateral movement accommodates acceleration and deceleration of platen 21 according to the mass to be moved therewith. The advantage of this improved arrangement is evident from the gain in cycle time. Thus, in the case referred to hereinabove the dry cycle of the injection clamping apparatus is reduced from approximately 4 seconds to approximately 1.2 seconds, of which the lateral shifting of platen 21 takes only 0.4 to 0.5 seconds including acceleration and deceleration. This improvement is particularly noticeable in connection with mechanical, e.g. toggle or crank clamping mechanisms which are favored for rapid acting injection clamps over fluid actuated clamps. In the former, the clamping apparatus, which is of the "fixed stroke" type can be used to induce the movement of platen 21 during that portion of its opening and closing stroke respectively which is in excess of the minimum clearance between core 20 and mold 17.

Figure 6:
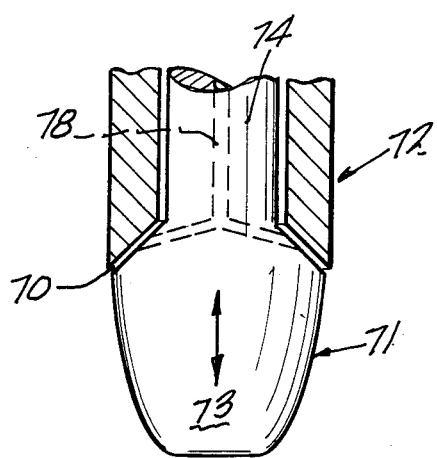

Cores 20 and 40 are equipped with fluid passageways terminating in so-called blow slots 70 as shown in FIG. 6 in order to effect blowing of the preforms in the blow molds, as is known in the art.

If permanently open, the blow slot 70 is connected according to conventional design of a source of pressure fluid and a source of vacuum via fluid passageway 78 whereby the change from one to the other is effected by a conventional valve in order for the dual function of the blow slot to be readily accomplished as needed during injection and opening of the injection mold, and then during blowing.

The blow slot may be formed of two elements of the core, for example leading element 71 and following element 72, that are capable of relative movement as shown in FIG. 6 by the arrow, with FIG. 6 showing leading element being relatively movable, with element 71 having a leading bulb-like portion 73 connected to a movable stem 74 which in turn is connected to a motive means (not shown). It is necessary to control the opening and closing of blow slot 70 mechanically in the following sequence: the blow slot is closed and held in that condition while injection of the plastic into the mold is initiated and almost immediately thereafter it is opened; alternatively, it may be kept closed until the filling of the mold is accomplished and opened only thereafter. Vacuum is applied while the blow slot is open and maintained as core 20 or 40 is moved away from injection station 10 (see FIGS. 1 and 2). The blow slot remains open and vacuum is maintained while the preform moves from the injection station into the blow station, at which time, by suitable valving, the vacuum is broken and fluid pressure applied inside the preform to expand it into the shape of the finished article. At the end of the blowing cycle, the connection between the blow slot and the source of fluid pressure is interrupted, but vacuum is not admitted inside the finished article.

Accordingly, in the case of an openable blow slot, the flow of fluid or connection to vacuum is controlled by a valve system that operates as follows:
1. open to vacuum;
2. closed to vacuum, open to pressure;
3. closed to pressure, open to atmosphere;
4. closed to pressure, closed to vacuum;
5. blow slot closed.

Figure 7:
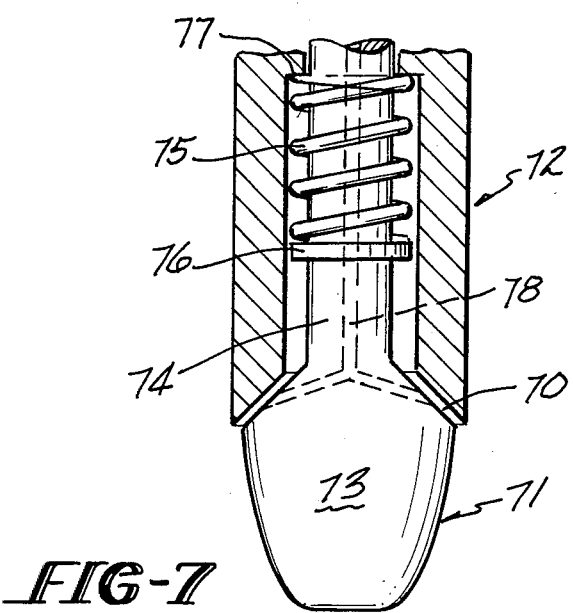
FIGS. 6 and 7 are partial views showing alternate core embodiments.

FIG. 7 shows one embodiment of actuating the blow slot 70. As shown, a spring 75 is provided, urging the movable element 71 forming the blow slot to open the latter. Stem 74 is provided with a fixed annular bar 76. Spring 75 is affixed to stem 74 between bar 76 and internal ridge 77 on element 72. When inserted into the injection station, the entering plastic will tend to counteract the force of spring 75 closing the blow slot. When the pressure of the entering plastic is relieved, spring 75 will tend to open the slot again. However, if now vacuum is applied, then atmospheric pressure will tend to close the slot or counteract the spring. Accordingly, the spring force chosen has to be such as to maintain the blow slot open against the atmospheric pressure so that vacuum may be applied. The total force due to atmosphere pressure counteracting the spring is of course one atmosphere times the maximum projected area of the movable portion of the core assembly, $=A^2\pi/4$. Accordingly, the force of the spring will be chosen well above that figure, for example, twice or three times that much, it being noted that the pressure of the plastic during injection is many times higher so that even with a stronger spring the blow slot will still be closed during the injection step.

Thus, the cores may be provided with means operative to close the blow slot under the pressure of incoming plastic and to open the blow slot when the pressure of the incoming plastic is relieved. If the blow slot is to be permanently open, it must of course be held to a dimension precluding clogging thereof by penetration of the plastic while under pressure. That dimension is accordingly chosen according to the viscosity of the plastic at pressure molding temperature. In the case of very thin fluid plastics, e.g. relatively low molecular weight polyethylene and nylon, it is not possible to produce a narrow enough slot and to maintain it economically. In the case of most amorphous plastics such as polystyrene, a permanently open slot may be used. As an improvement, the faces of the corresponding blow core components forming the slot are slightly tapered toward the outside as shown in FIGS. 6 and 7, i.e. the side facing away from the core, and they are preferably coated with a substance that prevents adhesion of the entering plastic to metal surfaces, e.g. teflon. In consequence, any slight amount of penetration into the slot will be cured during the blowing step, at which time the plastic that will thus have entered the blow slot will be blown out.

The above described apparatus features interact with the process, particularly because a critical relationship exists between the temperature of the plastic at any given stage and the rate and magnitude of the forming operation to which it is subjected. The process of injection blow molding is of course aimed at providing a predetermined shape of the finished article. In addition, in most instances, as when converting brittle plastics into thin-walled objects, the process is used to improve the properties of the plastic, such as strength, ductility, resistance to permeation, etc. by molecular orientation, the details of which are well known, including the fact that the best levels of orientation are obtained by conducting the forming process at the lowest temperature compatible with the glass transition range of the given plastic that the chosen procedure is capable of.

In high speed operation, such as the one at which this invention is aimed, several factors have to be reconciled:

the plastic has to be pressure formed rapidly, hence its temperature is left relatively high;

the parison has to be removed from the parison mold after the shortest possible dwell therein, in order to proceed to the next molding cycle, all without tending to adhere to the mold and become deformed thereby;

the temperature of the parison has to reach a level suitable for orientation during the short dwell in the parison mold and the comparatively short time, shortened by the clamp action described herein, during which the parison is transported into the blow mold;

the temperature at which the deformation of the parison, i.e. blowing takes place should be uniformly maintained while the parison is expanding and until it contacts the parison mold;

in no case must the parison be damaged, nor deformed in the course of any operation to which it is subjected, except of course blowing.

A typical use of this invention will serve as an example hereinbelow, namely the manufacture of a thin-walled drinking cup of generally known configuration, from polystyrene, e.g. Styron 685 made by the Dow Chemical Company. In order to obtain satisfactory filling of the mold at a fast rate, it is injected at 560°–570° F. The parison tends to adhere to the parison mold cavity wall until its temperature drops to approximately 150° F. The newly molded parison, with a wall thickness increasing from 0.3 mm to 0.6 mm from its open end towards its bottom dwells in the parison mold for approximately 0.8 seconds with the mold cavity wall at a temperature of 140° F. which is long enough for the parison to become removable without sticking. The core in turn is kept at a temperature of 260° F. for the most part, with the region near the blow slot separately controlled at 220° F. or slightly lower to minimize penetration of the plastic thereinto.

As a result, temperatures of the inner and outer surface of the parison are so balanced under action of the core and mold respectively that said parison remains highly deformable while being readily separated from the parison mold cavity and transferred to the blow mold. For example, inertia forces that can arise due to acceleration or deceleration during transfer are capable of producing eccentricity of the wall thickness distribution. To overcome this danger, vacuum is applied to adhere the parison to the core while being separated from the parison mold and while transported and the acceleration and deceleration is closely controlled as disclosed herein.

At the time of blowing, the temperature distribution explained above will have changed to being substantially uniform at a level desirable for molecular orientation, resulting in substantially uniform properties throughout the finished article according to the amount of deformation any one region thereof will have experienced due to blowing.

Accordingly, the features of the present invention shorten the process cycle by making it possible to operate safely at elevated temperatures.

Once placed into the blow mold, the vacuum is released and blowing pressure of 100–300 psi is applied which may be accompanied by forward movement of pusher plate 52 in order to center the parison or the movable element of the blow core shown in FIG. 7, to stretch it into contact with the blow mold.

If such movement of the blow core element is used, it must not precede initiation of blowing, so as to assure that no friction or adhesion exists between the parison and the core while the former is being moved axially.

Clearly, the time available for the process steps of producing the parison and cooling the finished article is approximately the same if the operation is to be preformed using the optimum cycle. For economy, the reliability and repeatability of the process steps are equally important. One of the important features of the apparatus herein described is its mechanical simplicity assuring such performance.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for injection blow molding hollow plastic articles which comprises: providing an injection mold including a mold cavity formed by a mold wall and a core; injecting molten plastic into said cavity to form a parison on said core; separating said parison from said mold wall by moving said parison on said core axially in a straight path away from said mold wall; providing a blow mold adjacent said mold cavity in side-by-side relationship therewith; moving said parison on said core in a substantially arcuate path into axial alignment with said blow mold; moving said parison on said core axially in a straight path into said blow mold; expanding said parison on said core in said blow mold to form said hollow article; separating said core from said hollow article in said blow mold and leaving said hollow article in said blow mold by moving said core axially in a straight path away from said blow mold, followed by moving said core in a substantially arcuate path into axial alignment with said mold wall and moving said core axially on a straight path into said mold wall for repeat of the cycle; providing a plane defined by the axes of the injection mold cavity and of said blow mold, wherein said arcuate path is coplanar with said plane and includes an arcuate section in which a change of velocity of said core takes place and a linear section of constant velocity.

2. A process according to claim 1 including the steps of providing an ejection station adjacent said blow mold in side-by-side relationship therewith and an ejection core engageable with said ejection station, moving said ejection core from said ejection station into engagement with said hollow article along a path parallel to the path of said core during the transfer of the core from said blow mold to said mold wall and simultaneously therewith, and moving said hollow article on said ejection core to said ejection station on a path parallel to the path of said parison on said core during transfer of the parison from the mold wall to said blow mold and simultaneously therewith.

3. A process according to claim 2 including providing a second core adjacent said first core and a second blow mold adjacent said injection mold and on the side thereof opposed to said blow mold, and a second ejection station and second ejection core adjacent said second blow mold and on the side thereof opposed to said ejection station and ejection core in side-by-side relationship therewith, and moving said second core and second ejection core on paths corresponding to the paths of said core and ejection core in an overlapping cycle with respect thereto.

4. A process according to claim 1 wherein said hollow article is a cup-shaped article having a curled top rim, a bottom portion and tapered side walls extending from said bottom to said rim.

5. A process according to claim 4 including the step of removing the core from said hollow article while leaving the article in the blow mold with the curved rim of the article lodged in the blow mold.

6. A process according to claim 1 wherein said arcuate path is characterized by an initial acceleration component followed by a constant velocity component followed by a deceleration component.

7. A process according to claim 2 including providing a pusher means in said blow mold adjacent to the base of said article to aid in removal of said article from the blow mold and moving said pusher means against the base of the article.

8. A process according to claim 3 wherein said core, ejection core, second core and second ejection core move on a common platen.

9. A process according to claim 2 including an axially movable stripper means on said ejection core and moving said stripper means axially to aid in removal of said article from said ejection core.

10. A process according to claim 1 including providing a blow slot on said core capable of being opened and closed, closing said blow slot under pressure of incoming plastic and opening said blow slot when the pressure is relieved.

11. A process according to claim 10 including tapering the faces of the core forming the blow slot.

12. A process according to claim 1 including applying vacuum to said parison through said core during separation of said parison from said mold wall.

13. Apparatus for injection blow molding hollow plastic articles which comprises: an injection mold including a mold wall; a core engageable with said injection mold to form a mold cavity with said mold wall; means to inject molten plastic into said mold cavity to form a parison therein; a blow mold adjacent said mold cavity in side-by-side relationship therewith; means to separate said parison from said mold wall operative to move said parison on said core axially in a straight path away from said mold wall followed by movement in a substantially arcuate path into axial alignment with said blow mold, followed by axial movement in a straight path into said blow mold; and means to expand said parison on said core in said blow mold to form said hollow article; means for separating said core from said hollow article in aid blow mold and leaving said hollow article in said blow mold by moving said core axially in a straight path away from said blow mold, followed by moving said core in a substantially arcuate path into axial alignment with said mold wall and moving said core axially on a straight path into said mold wall for repeat of the cycle; the axes of the injection mold and of the blow mold defining a plane that is coplanar with the plane of said arcuate path including an arcuate section during which a change of velocity of said core takes place and a linear section of constant velocity.

14. Apparatus according to claim 13 including an ejection station adjacent said blow mold in side-by-side relationship therewith and an ejection core engageable with said ejection station, means for moving said ejection core from said ejection station into engagement with said hollow article along a path parallel to the path of said core during the transfer of the core from said blow mold to said mold wall and simultaneously therewith, and means for moving said hollow article on said ejection core to said ejection station on a path parallel to the path of said parison on said core during transfer of the parison from the mold wall to said blow mold and simultaneously therewith.

15. Apparatus according to claim 14 including a second core adjacent said first core and a second blow mold adjacent said injection mold and on the side thereof opposed to said blow mold, and a second ejection station and second ejection core adjacent said second blow mold and on the side thereof opposed to said ejection station and ejection core in side-by-side relationship therewith, and means for moving said second core and second ejection core on paths corresponding to the paths of said core and ejection core in an overlapping cycle with respect thereto.

16. Apparatus according to claim 13 wherein said means to separate the parison from the mold wall is characterized by an initial acceleration component followed by a constant velocity component followed by a deceleration component.

17. Apparatus according to claim 14 including a pusher means in said blow mold adjacent to the base thereof to aid in removal of the article from the blow mold and means for moving said pusher means against the base of the article.

18. Apparatus according to claim 13 including means for applying a vacuum through said core.

19. Apparatus according to claim 14 including an axially movable stripper means on said ejection core and means for moving said stripper means axially to aid in removal of the article from said ejection core.

20. Apparatus according to claim 13 including a blow slot on said core capable of being opened and closed and means on said blow slot operative to close said blow slot under pressure of incoming plastic and operative to open said blow slot when said pressure is relieved.

21. Apparatus according to claim 20 wherein the faces of the core forming the blow slot are tapered.

* * * * *